(12) United States Patent
Varatharajah et al.

(10) Patent No.: US 12,009,549 B2
(45) Date of Patent: Jun. 11, 2024

(54) BATTERY TERMINAL BUSHING AND LEAD ACID BATTERY

(71) Applicant: CPS Technology Holdings LLC, New York, NY (US)

(72) Inventors: Arunraj Varatharajah, Menomonee Falls, WI (US); Vladimir Garcia Hernandez, San Nicolas de los Garza NL (MX); Jason D. Fuhr, Sussex, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 17/772,587

(22) PCT Filed: Oct. 30, 2020

(86) PCT No.: PCT/US2020/058338
§ 371 (c)(1),
(2) Date: Apr. 28, 2022

(87) PCT Pub. No.: WO2021/087346
PCT Pub. Date: May 6, 2021

(65) Prior Publication Data
US 2023/0006318 A1 Jan. 5, 2023

Related U.S. Application Data

(63) Continuation-in-part of application No. 29/730,432, filed on Apr. 3, 2020, now Pat. No. Des. 990,431, and
(Continued)

(51) Int. Cl.
H01M 50/00 (2021.01)
H01M 10/12 (2006.01)
(Continued)

(52) U.S. Cl.
CPC ........ H01M 50/561 (2021.01); H01M 10/12 (2013.01); H01M 50/541 (2021.01)

(58) Field of Classification Search
CPC ... H01M 50/552; H01M 10/12; H01M 50/541
See application file for complete search history.

(56) References Cited

U.S. PATENT DOCUMENTS

D59,370 S   10/1921  Moffat
3,992,224 A  11/1976 Fielding
(Continued)

FOREIGN PATENT DOCUMENTS

EP   3133674 A1   2/2017
EP   3624232 A1   3/2020
(Continued)

OTHER PUBLICATIONS

International Search Report and Written Opinion for PCT/US2020/058338, dated Feb. 11, 2021, 11 pages.

*Primary Examiner* — Cynthia H Kelly
*Assistant Examiner* — Monique M Wills
(74) *Attorney, Agent, or Firm* — Boardman & Clark LLP

(57) ABSTRACT

A battery terminal bushing is disclosed. The battery terminal bushing comprises a body having an insertion end and an exterior end opposite the insertion end. One or more sealing rings surround the body between the insertion end and the exterior end. A terminal post connector segment is provided on the insertion end of the body. An anti-torque pattern is provided on one or more surfaces of the body configured to engage and be contained within the battery housing material. A lead acid battery comprising the battery terminal bushing is also disclosed.

20 Claims, 15 Drawing Sheets

Related U.S. Application Data a continuation-in-part of application No. 29/711,692, filed on Nov. 1, 2019, now Pat. No. Des. 944,737, and a continuation-in-part of application No. 29/711,687, filed on Nov. 1, 2019, now Pat. No. Des. 988,264, and a continuation-in-part of application No. 29/711,693, filed on Nov. 1, 2019, now Pat. No. Des. 944,203.

(51) Int. Cl.
*H01M 50/541* (2021.01)
*H01M 50/552* (2021.01)

(56) References Cited

U.S. PATENT DOCUMENTS

| | | | |
|---|---|---|---|
| 4,120,087 A | 10/1978 | McEwan | |
| 6,258,481 B1 | 7/2001 | Ross | |
| D529,441 S | 10/2006 | LePere | |
| 9,099,730 B2 | 8/2015 | Thuerk | |
| 9,748,551 B2 | 8/2017 | Cain | |
| 10,396,473 B2 | 8/2019 | Bellete | |
| D864,125 S | 10/2019 | Selig | |
| D944,203 S | 2/2022 | Varatharajah | |
| D944,737 S | 3/2022 | Varatharajah | |
| D956,522 S | 7/2022 | Smith | |
| 2011/0014513 A1 | 1/2011 | Wolfgang | |
| 2016/0020440 A1* | 1/2016 | Kesper | H01M 50/186 429/158 |
| 2016/0043377 A1 | 2/2016 | Heid | |
| 2018/0175363 A1 | 6/2018 | Heid | |
| 2019/0267600 A1 | 8/2019 | Robert | |
| 2020/0243832 A1 | 7/2020 | Chandler | |
| 2021/0005870 A1 | 1/2021 | Koop | |

FOREIGN PATENT DOCUMENTS

| | | |
|---|---|---|
| JP | 2014007076 A | 1/2014 |
| WO | 2009/142621 A1 | 11/2009 |
| WO | 2021/087346 A1 | 5/2021 |
| WO | 2021087346 A1 | 5/2021 |

* cited by examiner

BATTERY TERMINAL BUSHING AND LEAD ACID BATTERY

CROSS REFERENCE TO RELATED APPLICATION

This application is a National Stage Patent Application of International Application Number PCT/US2020/058338, entitled "BATTERY TERMINAL BUSHING & LEAD ACID BATTERY", filed Oct. 30, 2020, which claims priority as a Continuation-in-Part to U.S. patent application Ser. No. 29/730,432, entitled "BATTERY MODULE BUS BAR CARRIER HAVING GUIDE EXTENSIONS SYSTEM AND METHOD", filed Apr. 3, 2020; claims priority as a Continuation-in-Part to U.S. patent application Ser. No. 29/711,692, entitled "BATTERY SIDE TERMINAL BUSHING", filed Nov. 1, 2019, now U.S. Pat. No. D944,737; claims priority as a Continuation-in-Part to U.S. patent application Ser. No. 29/711,693, entitled "BATTERY SIDE TERMINAL BUSHING", filed Nov. 1, 2019, now U.S. Pat. No. D944,203; and claims priority as a Continuation-in-Part to U.S. patent application Ser No. 29/711,687 entitled "BATTERY SIDE TERMINAL. BUSHING", filed Nov. 1, 2019, the entire contents of each of which is hereby incorporated by reference herein in its entirety.

BACKGROUND

The disclosure herein relates to the field of battery terminals for lead acid batteries. The disclosure herein more specifically relates to the field of bushings for battery terminals of lead acid batteries.

Lead acid batteries are known. Lead acid batteries are made up of plates of lead and separate plates of lead dioxide, which are submerged into an electrolyte or acid solution. The lead, lead dioxide and electrolyte provide a chemical means of storing electrical energy which can perform useful work when the terminals of a battery are connected to an external circuit. The plates of lead, lead dioxide and electrolyte, together with a battery separator, are contained within a housing of a polypropylene material.

In batteries with multiple cell elements, the cells are connected in series by conductive straps or intercell connectors. The straps also connect the cells to a positive terminal and a negative terminal. These terminals are accessible outside the battery housing. These terminals allow for a vehicle (or other application) to connect to the battery for use. The conductive straps and terminals comprise a conductive material. Typically, in a lead-acid battery, this conductive material is comprised of lead.

In a lead acid battery, a battery bushing forms a portion of the terminal and typically serves as the contact and fastener between the polymer housing of a lead acid battery and the metal, typically lead, battery terminal. This bushing must provide resistance to acid leakage through this interface.

Additionally, when a battery cable is coupled to a battery terminal (to access the available power from the battery), the battery terminal may experience torque. In order to properly fasten the battery cable, the battery terminal must resist at least the applied torque. In addition, when in use in a vehicle, for example, the battery may be jostled and moved during travel causing the battery cable to torque the terminal and associated bushing.

Accordingly, a bushing for a lead acid battery and battery terminal is needed which has improved resistance to acid leakage and improved resistance to torque.

SUMMARY

A battery terminal bushing is disclosed. The battery terminal bushing comprises a body having an insertion end and an exterior end opposite the insertion end. One or more sealing rings surround the body between the insertion end and the exterior end. A terminal post connector segment is provided on the insertion end of the body. An anti-torque pattern is provided on one or more surfaces of the body configured to engage and be contained within the battery housing material. A lead acid battery comprising the battery terminal bushing is also disclosed.

An additional battery terminal bushing is disclosed. The battery terminal bushing comprises a body having an insertion end and an exterior end opposite the insertion end and one or more sealing rings on the body. A plurality of anti-torque features are provided on the body. The anti-torque features comprise a surface area of at least approximately 200 mm2 and provide a resistance to torque which is greater than 150 inch-pounds of torque. A lead acid battery comprising the battery terminal bushing is also disclosed.

An additional battery terminal bushing is also disclosed. The battery terminal bushing comprises a body having an insertion end and an exterior end opposite the insertion end. One or more sealing rings are provided on the body. An anti-torque pattern is also provided on the body which comprises a resistance to torque which is greater than 150 inch-pounds of torque. A lead acid battery comprising the battery terminal bushing is also disclosed.

These and other features and advantages of devices, systems, and methods are described in, or are apparent from, the following detailed descriptions and drawings of various examples of embodiments.

BRIEF DESCRIPTION OF DRAWINGS

Various examples of embodiments of the systems, devices, and methods will be described in detail, with reference to the following figures, wherein.

It should be understood that the drawings are not necessarily to scale. In certain instances, details that are not necessary to the understanding of the invention or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

Referring to the Figures, a battery 100 is disclosed, and in particular a rechargeable battery, such as, for example, a lead acid battery. Various embodiments of lead acid storage batteries may be either sealed (e.g., maintenance-free) or unsealed (e.g., wet). While specific examples are described and illustrated, the battery 100 may be any secondary battery suitable for the purposes provided.

Figure 1:
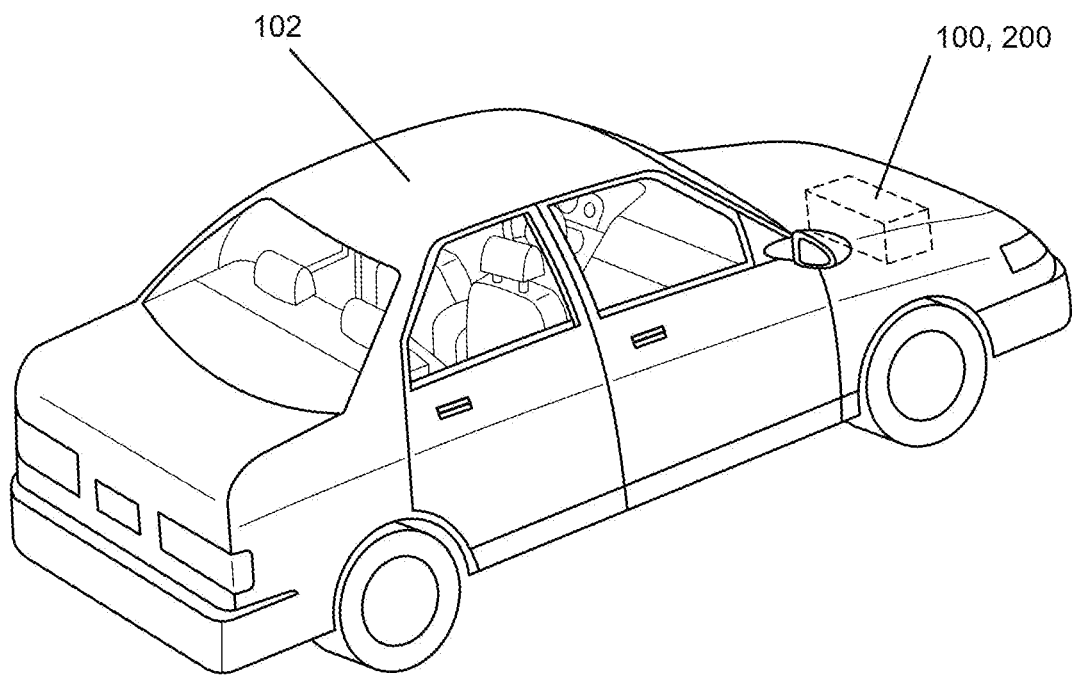
FIG. 1 is a perspective view of a vehicle for use with lead acid battery according to one or more examples of embodiments described herein.
Figure 2:
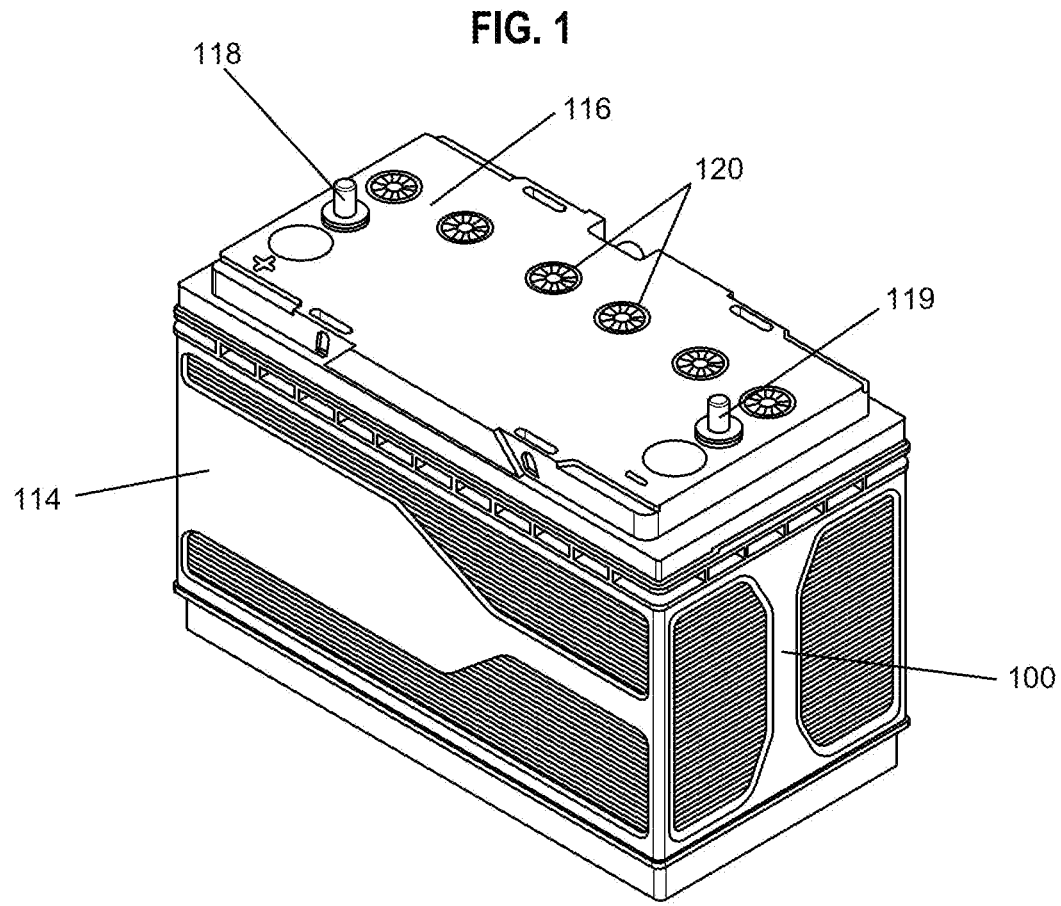
FIG. 2 is a perspective view of lead acid battery according to one or more examples of embodiments described herein, showing one or more examples of battery terminals on the cover of the battery.
Figure 3:
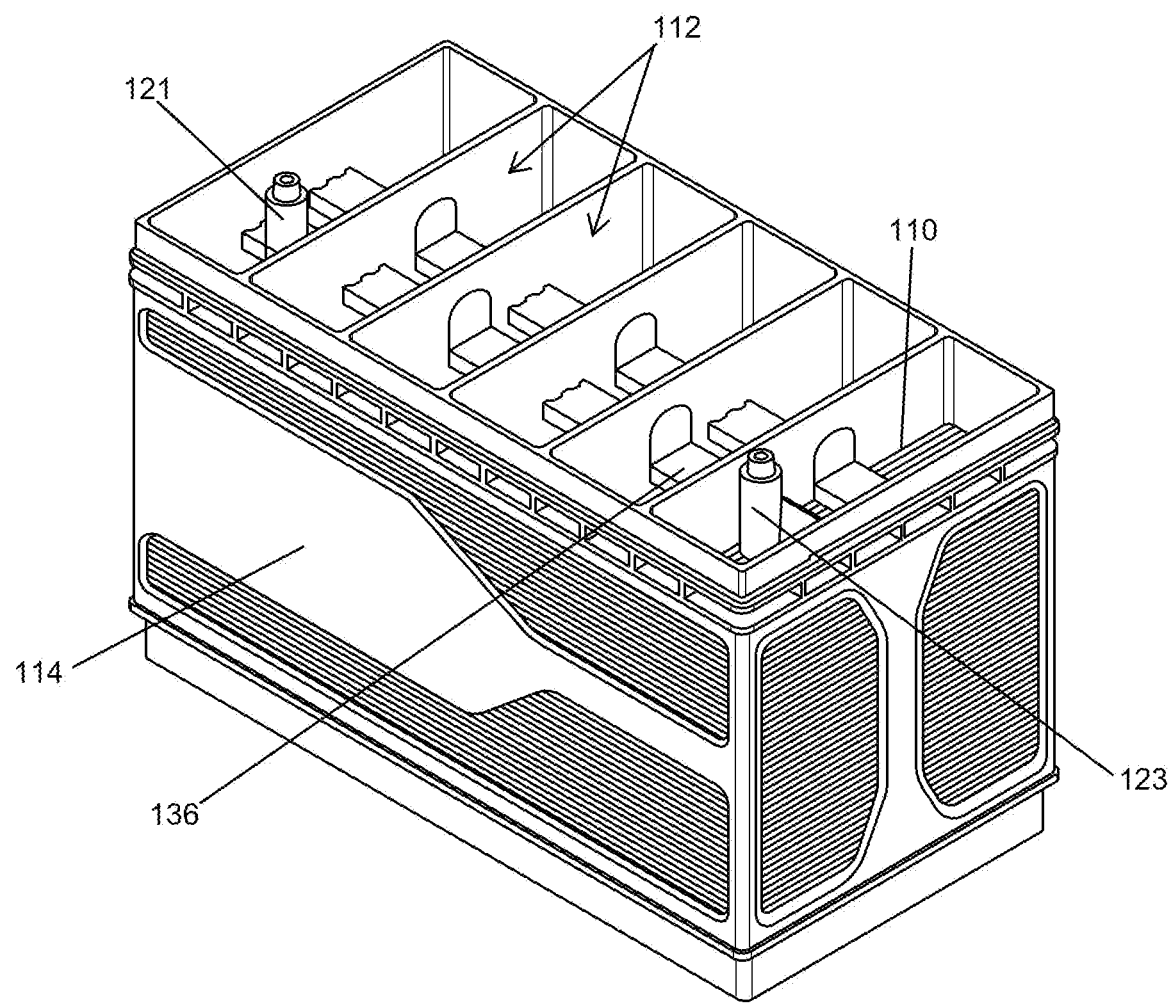
FIG. 3 is a perspective view of the lead acid battery shown in FIG. 2, with the cover removed.
Figure 4:
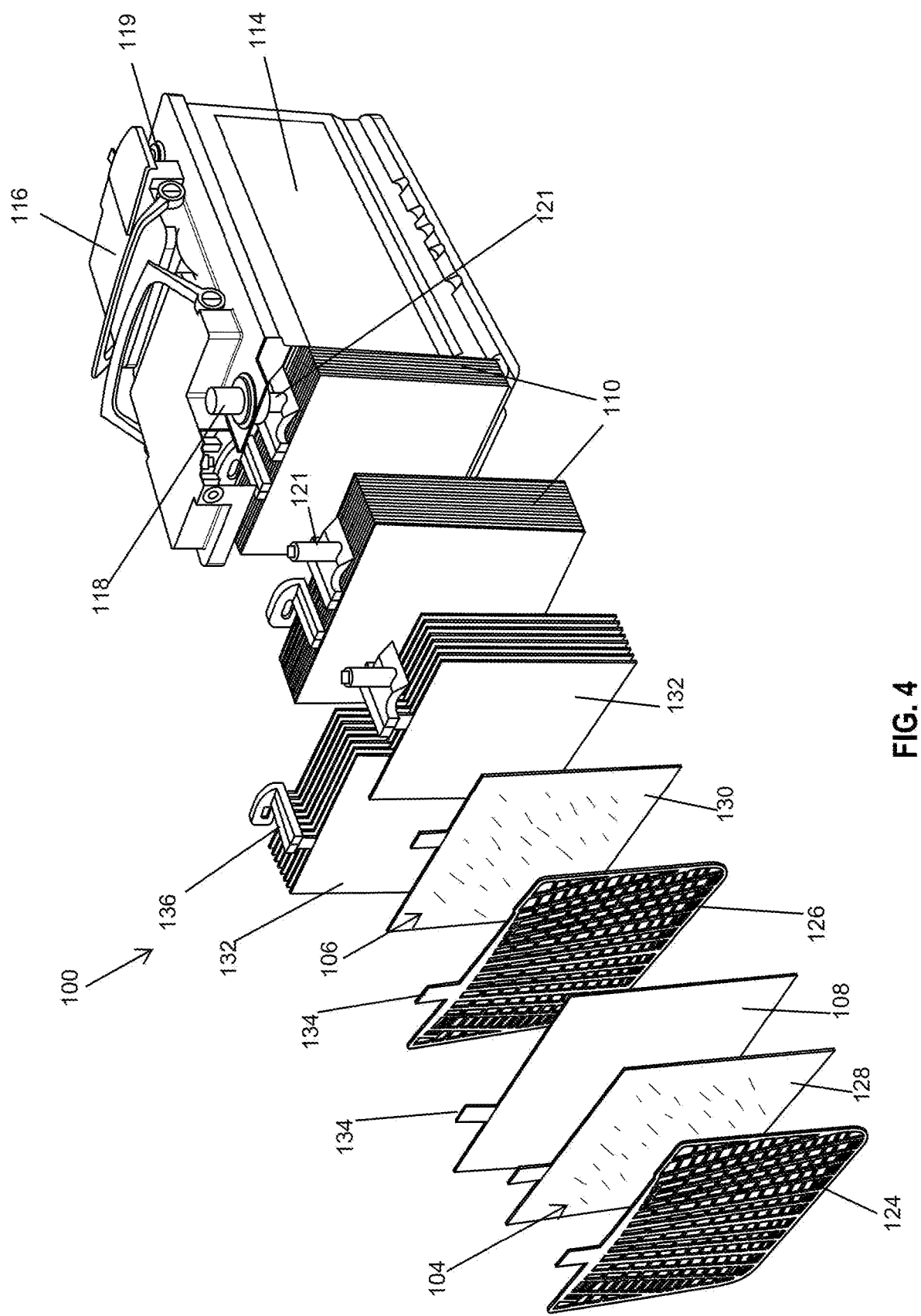
FIG. 4 is an exploded perspective view of a lead acid battery according to one or more examples of embodiments described herein, showing one or more alternative examples of battery terminals on the cover of the battery.

One example of a battery 100 is provided and shown in a vehicle 102 in FIG. 1. While a vehicle battery is shown and described, the disclosure and system described herein are not limited thereto. The battery 100 may be any type of lead acid battery, including for example, industrial or back-up batteries, as well as other types of lead acid batteries. Referring to FIGS. 2-4, the battery 100 is a lead acid battery. The lead acid battery 100 is composed of a housing 114 or container which includes a cover 116. Cover 116 is provided for the container or housing 114 and may be sealed to the container 114. In various embodiments, the container 114 and/or cover 116 includes battery terminals 118, 119. The battery cover 116 may also include one or more filler hole caps and/or vent assemblies 120 (see FIG. 2). An electrolyte, which is typically sulfuric acid, may be included in the battery 100 within the housing 114.

Within the container 114 are positive and negative electrodes or plates 104, 106. Referring to FIG. 4, the electrodes 104, 106 include electrically-conductive positive or negative current collectors or substrates or grids 124, 126. A "grid" may include any type of mechanical support for the active material. Positive paste 128 is provided in contact with and/or on the positive grid 124 and negative paste 130 is provided on the negative grid 126. More specifically, the positive plate 104 includes a positive grid 124 having or supporting a positive active material or paste 128 thereon; and the negative plate 106 includes a negative grid 126 having or supporting a negative active material or paste 130 thereon. Positioned between the positive and negative electrodes or plates 104, 106 is a separator 108. In a retained electrolyte-type battery 100, the separator 108 may be a porous and absorbent glass mat (AGM).

A plurality of positive electrodes or plates 104 and a plurality of negative electrodes or plates 106 (with separators 108) generally make up at least a portion of the electrochemical cell 110 (see FIGS. 3-4). The plurality of positive electrodes or plates 104 and negative electrodes or plates 106 (including separators 108) may be provided in stacks or sets or cell elements 110 for producing a battery having a predetermined voltage, as one example a 12-volt battery in a vehicle 102. The number of cell elements 110 or groups or sets may be varied. It will also be obvious to those skilled in the art after reading this specification that the size and number of electrodes 104 and/or 106 in any particular group (including the size and number of the individual current collectors), and the number of groups used to construct the battery 100 may vary depending upon the desired end use.

Referring to FIGS. 3-4, a plurality of plate or electrode sets or books or cell elements 110 may be electrically connected, e.g., electrically coupled in series or other configuration, according to the capacity of the lead-acid storage battery 100. Each current collector has a lug 134 (see FIG. 4). In FIGS. 3-4, one or more cast-on straps or intercell connectors 136 are provided which electrically couple the lugs 134 of like polarity in an electrode or plate set or cell element 110 and to connect other respective sets or cell elements 110 in the battery 100. The connection of the elements may be a single element, parallel connection (capacity doubled, voltage the same) or series connection (e.g., voltages are additive, i.e., 4V, 6V, etc., with the same capacity).

One or more positive terminal posts 121 and one or more negative terminal posts 123 (FIG. 3, 4) may also be provided electrically coupled to the battery cells 110 and intercell connectors 136. Such terminal posts generally include portions which may extend through the cover and/or container wall, e.g., a sidewall, depending upon the battery design and/or couple to a terminal or terminal bushing. It will be recognized that a variety of terminal arrangements are possible, including top, side, front or corner configurations known in the art.

Figure 7:
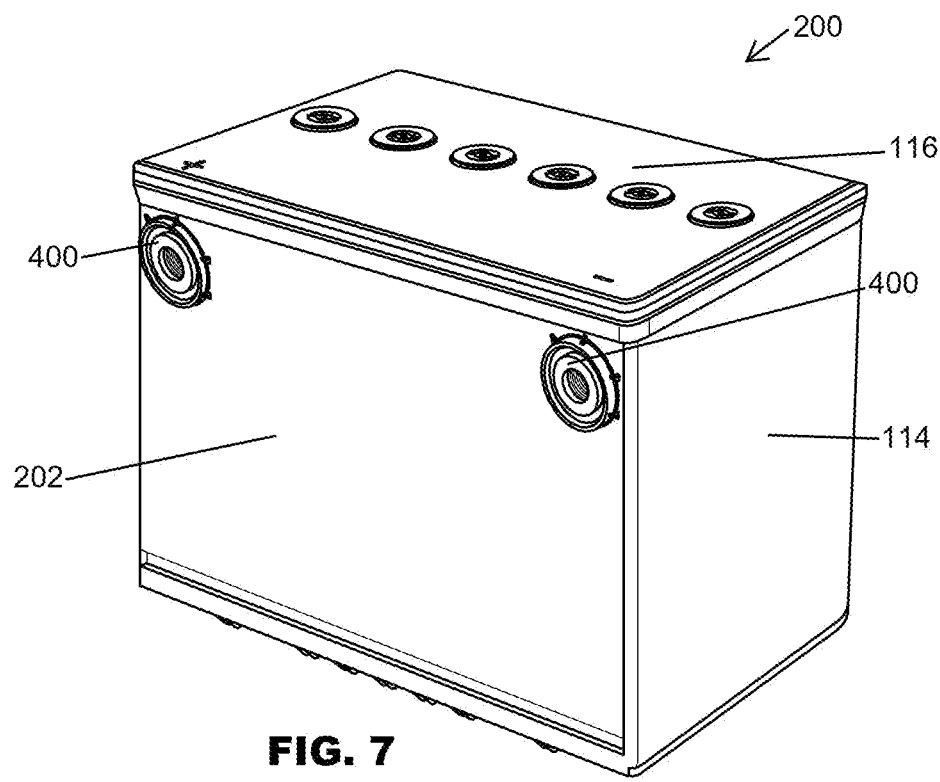
FIG. 7 is a perspective view of a lead acid battery according to one or more alternative examples of embodiments described herein, showing one or more examples of battery terminals or battery terminal bushings on a sidewall of the battery.

FIG. 2 shows a battery 100 having one or more examples of positive and negative terminals 118, 119 extending from the cover or lid 116. FIG. 4 shows a battery 100 having one or more alternative examples of embodiments of positive and negative terminals 118, 119 extending from the cover or lid 116. FIG. 7 shows a battery 200 having one or more alternative examples of battery terminals 218, 219 on a sidewall 202 of housing 114 of the battery 200.

Generally, the terminal 118, 119; 218, 219 includes a terminal post which extends to and/or through a bushing 300, 400. The terminal post 121, 123 may be fused or joined to the bushing 300, 400 to form a singular integral component. In this regard, the terminal bushing 300, 400 has a terminal post connector segment 302, 402 provided on the insertion end 304, 404 of the body 306, 406 of the bushing.

Figure 5:
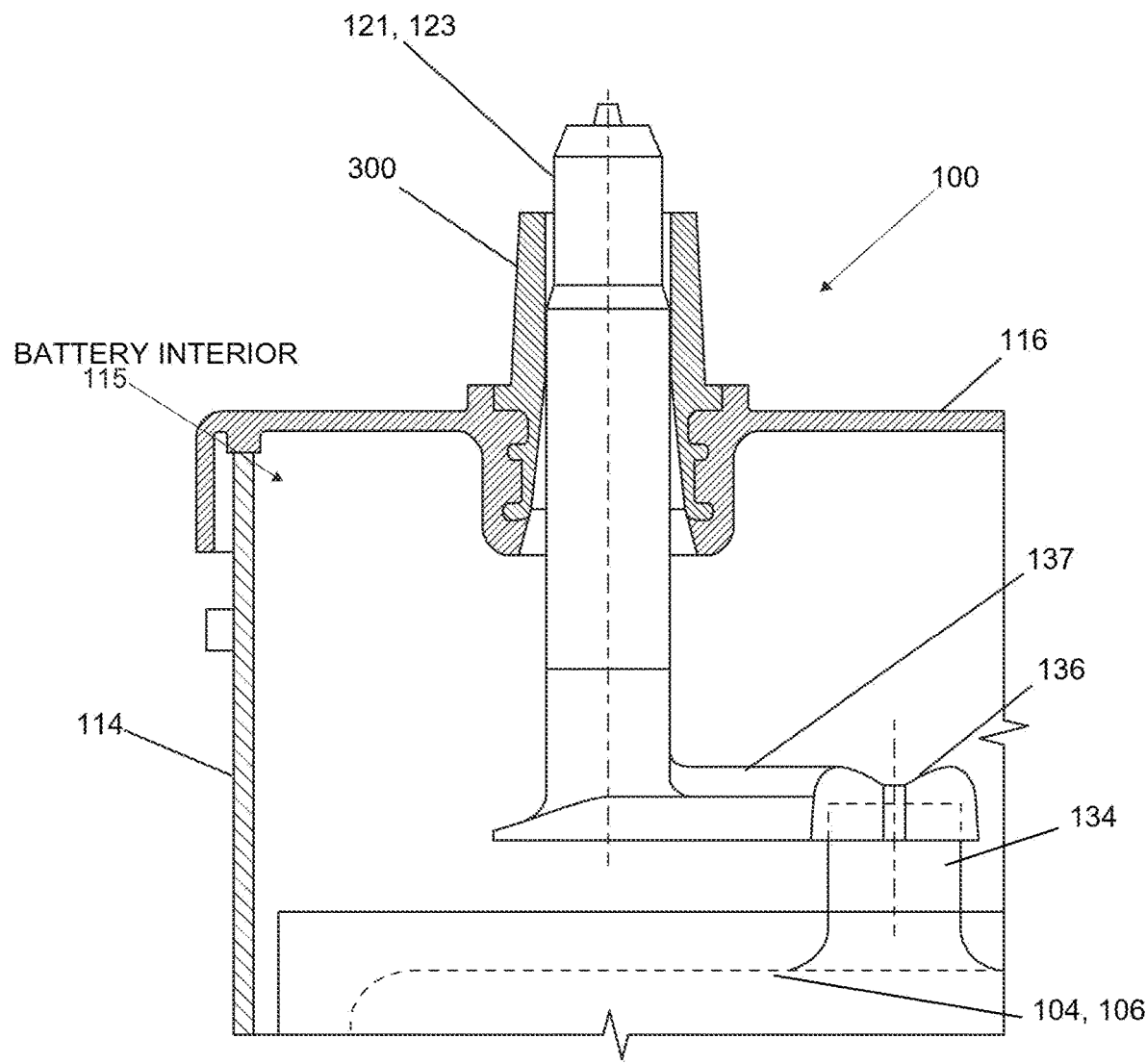
FIG. 5 is a section view of a lead acid battery shown in FIGS. 2, 4, showing a battery element coupled to an end strap of the intercell connectors which leads to a terminal post.

FIG. 5 shows an example of a section of a battery 100. The battery 100 includes a battery element 110 coupled to an end strap 137 of the intercell connectors 136 which leads to a terminal post 121 or 123. The terminal post 121 or 123 extends through or to the terminal post connector segment 302, 402 on the insertion end 304, 404 of the body 306, 406, and in one example, through the bushing 300 provided within the cover 116 of the battery housing 114.

Figure 6:
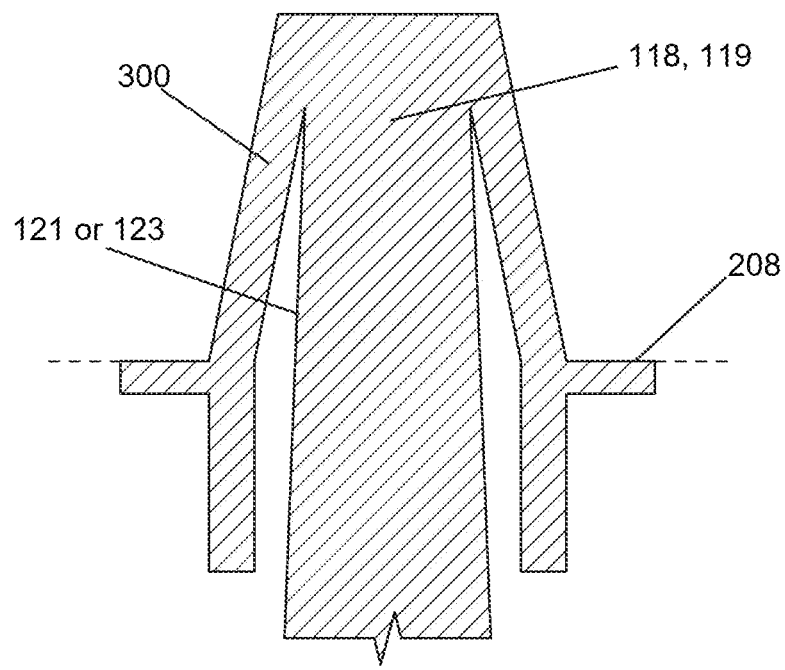
FIG. 6 is a cross-section of a battery terminal for use with the lead acid battery shown in FIGS. 2, 5, showing an example of battery terminal after welding/fusing of the battery terminal and bushing.

FIG. 6 shows an example of battery terminal after welding/fusing of the battery terminal 121 or 123 and bushing 300. The Figure more specifically shows a cross-section of a battery terminal 118 or 119, according to one or more examples of embodiments described herein. The terminal post 118 or 119 is provided inside of the terminal bushing 300. Together (terminal post 118 or 119 and terminal bushing 300) they form a battery terminal 118 or 119 which protrudes through a surface or cover 116 and provides the point of electrical coupling to the battery 100 (e.g., by a battery cable).

Figure 8:
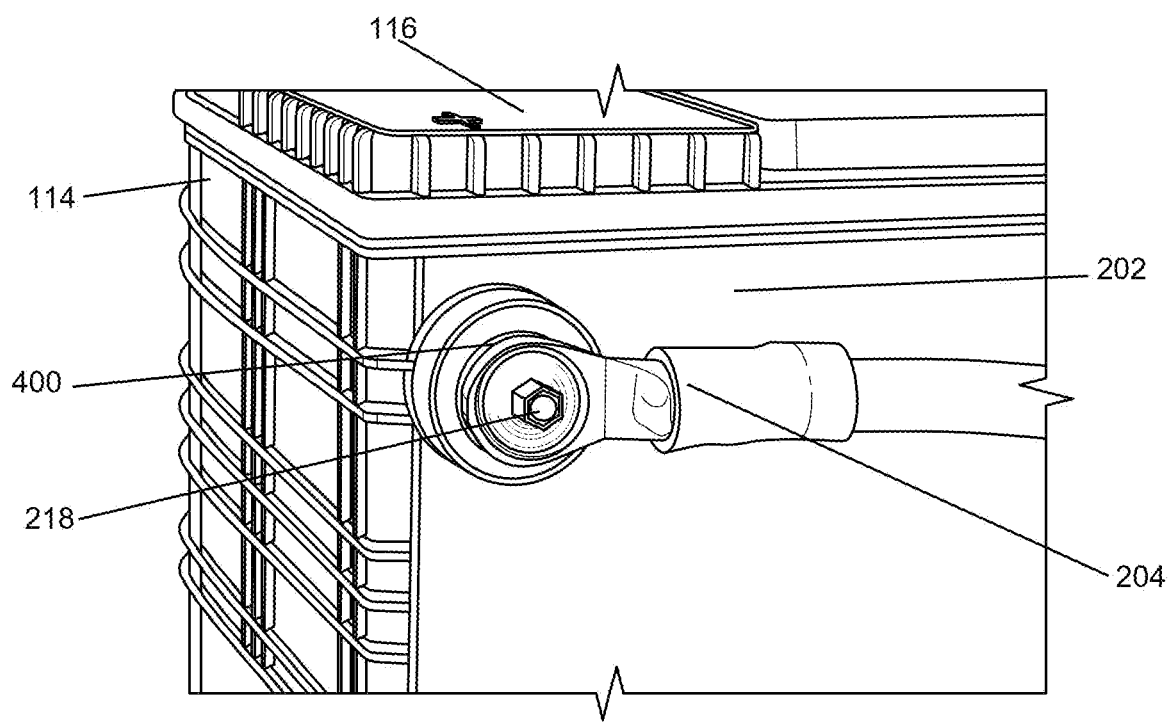
FIG. 8 is a partial perspective view of the lead acid battery shown in FIG. 7, showing a battery cable connected to the battery terminal on a sidewall of the battery.

FIG. 7 is a perspective view of a lead acid battery 200 according to one or more alternative examples of embodiments described herein, showing one or more examples of battery terminals or bushings 400 on a sidewall of the battery. Battery 200 includes a housing 114 and cover 116. FIG. 8 is a partial perspective view of the lead acid battery 200 shown in FIG. 7, showing a battery cable 204 connected to the battery terminal 218 on a sidewall 202 of the battery 200. In this regard, as shown in FIG. 7, the battery 200 has a bushing 400 for a positive terminal and a bushing 400 for a negative terminal located on the sidewall 202 of the battery housing 114. While a specific location is illustrated in the figures, the terminals may be provided on any wall or the cover 116 of the battery, and may be provided on the same surface or different surfaces of the battery without departing from the overall scope of the present invention. Each bushing 400 includes a internally threaded portion 408 which receives a threaded terminal post 218 that may be used to join a battery cable 204 as shown in FIG. 8.

Figure 12:
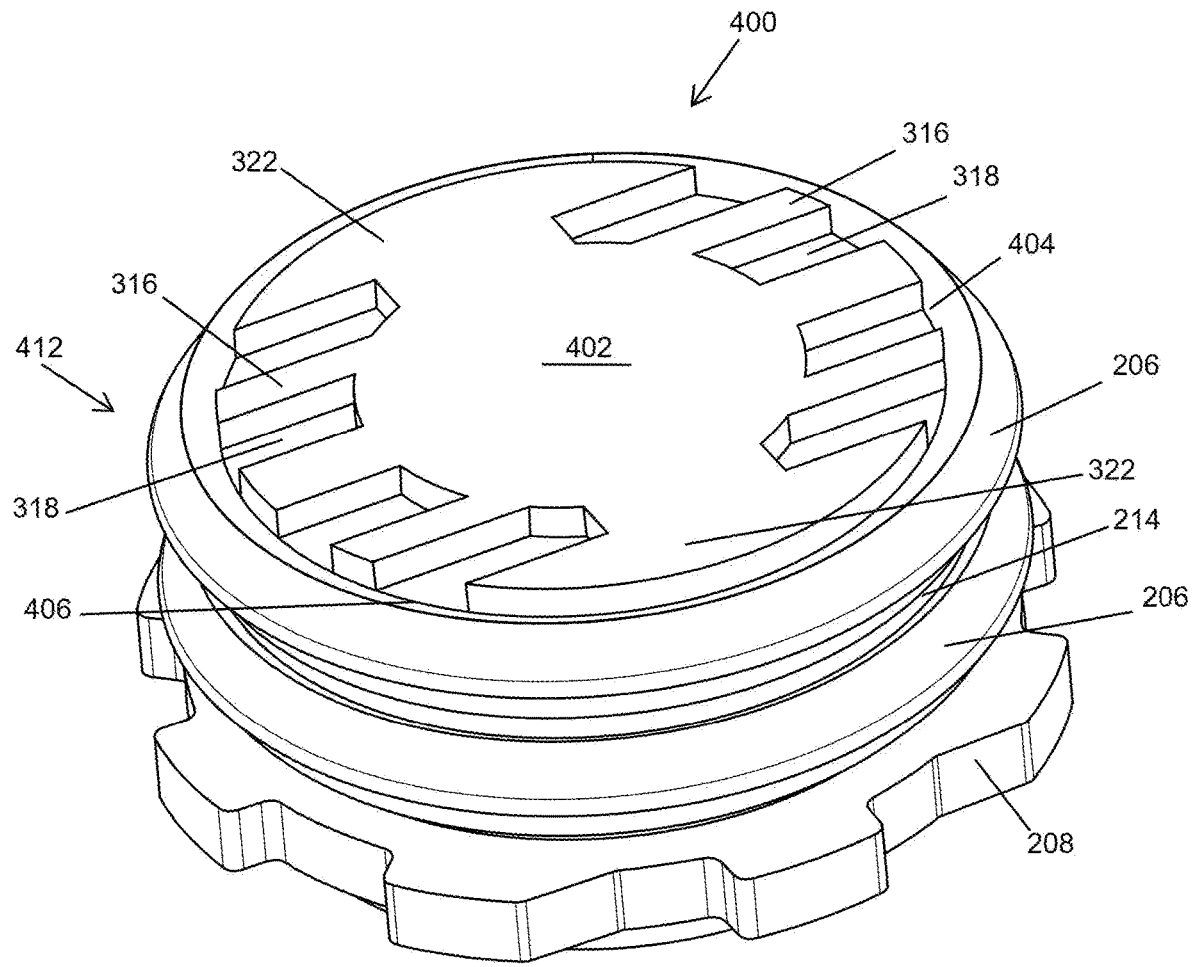
FIG. 12 is a rear perspective view of the battery terminal bushing or side terminal bushing shown in FIG. 11.

Similar to the lead acid battery 100, the battery terminal 400 is joined or welded/fused to a terminal post 118 on an end strap 137. As can be seen in FIG. 12, a central segment or connector segment 402 is provided which may be a terminal post connector segment on the insertion end 404 of the body 406. That is, the central segment or terminal post connector segment 404 is provided on an interior side 115 of the battery bushing. In a side terminal bushing, this segment 404 may be generally solid and may be centrally located for joining to the terminal post 118 or a terminal flag or other electrical coupling device known in the art for joining the cell element 110(s) to the battery terminals and bushings.

In one or more examples of embodiments, the positive grid 124 and the negative grid 126 may be primarily composed of lead or lead alloy. The active material or paste (positive and negative) may also be formed of compositions including lead or lead oxide. In one or more preferred examples, the lead may be a recycled lead. Similarly, the intercell connectors 136, end straps 137, terminals, 118, 119, terminal posts 121, 123 and/or bushings 300, 400 may be composed of lead or lead alloy. In some examples of embodiments, the alloy may be a substantially pure lead and may, in some examples of embodiments, include lead, tin, antimony, calcium, and combinations thereof. The alloy may, as a non-limiting example, be a lead tin alloy with a tin composition range of 1-4%, 1-2.25%, 1-1.5%, and the like. The lead may be virgin lead or high purity lead or highly purified secondary lead, in various examples of embodiments. In one or more examples of embodiments, the lead or lead alloy may be a recycled lead or lead alloy. The bushing made of lead may be constructed by common methods in the art, including but not limited to, cold forming and/or die casting and/or combinations thereof.

The housing 114 and cover 116 may be primarily composed of a polymer material. For example, the cover 116, container/housing 114, and/or various components may be made of any polymeric (e.g., polyethylene, polypropylene, a polypropylene containing material, etc.) or composite (e.g., glass-reinforced polymer) material. In one or more examples of embodiments, the polymer material may be a recycled polymer material. In this regard, the container 114 and/or cover 116 may be made of polypropylene-containing material (e.g., pure polypropylene, co-polymers comprising polypropylene, polypropylene with additives, etc.), or other materials resistant to the caustic acid electrolyte.

Accordingly, in an assembled lead acid battery 100, 200, a metal or lead component, namely, a bushing 300 or 400 may be attached or secured within the polymeric housing 114 or cover 116 material.

Within the polymeric housing 114 and cover 116 in a lead acid battery is oftentimes a liquid electrolyte such as a sulfuric acid. It is not desirable for the acid to leak from the battery housing 114 or cover 116. Aside from the environmental and health and safety impacts of exposure to the acidic electrolyte, acid which leaks may also cause "black post," namely, a condition in which the battery terminal and/or bushing discolors leading to warranty claims and other issues with the battery. Retention of the electrolyte within the battery is made even more challenging by the joining of two different materials which do not naturally fuse or join together. These two components composed of different material compositions must form a tight seal.

In addition, a battery terminal is subjected to torque. In one example, a connecting cable or battery cable 204 (such as from a vehicle 102) is attached to the battery terminal 218 (see e.g., FIG. 8). In a vehicle 102, a battery 100, 200 may be subject to different loads or stresses and motion. As a result, the cable 204 may apply a torque or rotational force to the battery bushing 300 or 400. Likewise, when a bushing 400 is used, such as shown in FIGS. 7-8, which includes an internal thread 408 that receives a terminal 218 or connection to a battery cable 204, a torque is applied to the battery bushing 400 as the terminal 218 is threaded into the internal thread 408. Because the bushing 300, 400 and the housing 114 or cover 116 are made of different materials, they may have different hardness, which may cause one material to deform as torque is applied. Moreover, the different materials may be difficult to rigidly secure (e.g., adhere) together. Therefore, a load or stress placed on one of the two components may cause the bushing 300, 400 to twist or rotate relative to the housing 114 or cover 116.

Accordingly, a bushing 300, 400 as provided herein has mechanisms and features which provide a resistance to, or prevention of, electrolyte leakage and torque resistance. To this end, a battery terminal bushing 300, 400 is disclosed. The battery terminal bushing 300, 400 comprises a body 306, 406 having an insertion end 304, 404 and an exterior end 310, 410 opposite the insertion end. One or more sealing rings 206 surround the body 306, 406 between the insertion end 304, 404 and the exterior end 310, 410. A terminal post connector segment 302, 402 is provided on the insertion end 304, 404 or side of the body 306, 406. An anti-torque feature 208 and/or 210, such as a pattern, is provided on one or more surfaces of the body 306, 406 configured to engage and be contained within the battery housing 114 or cover 116 material.

Figure 9:
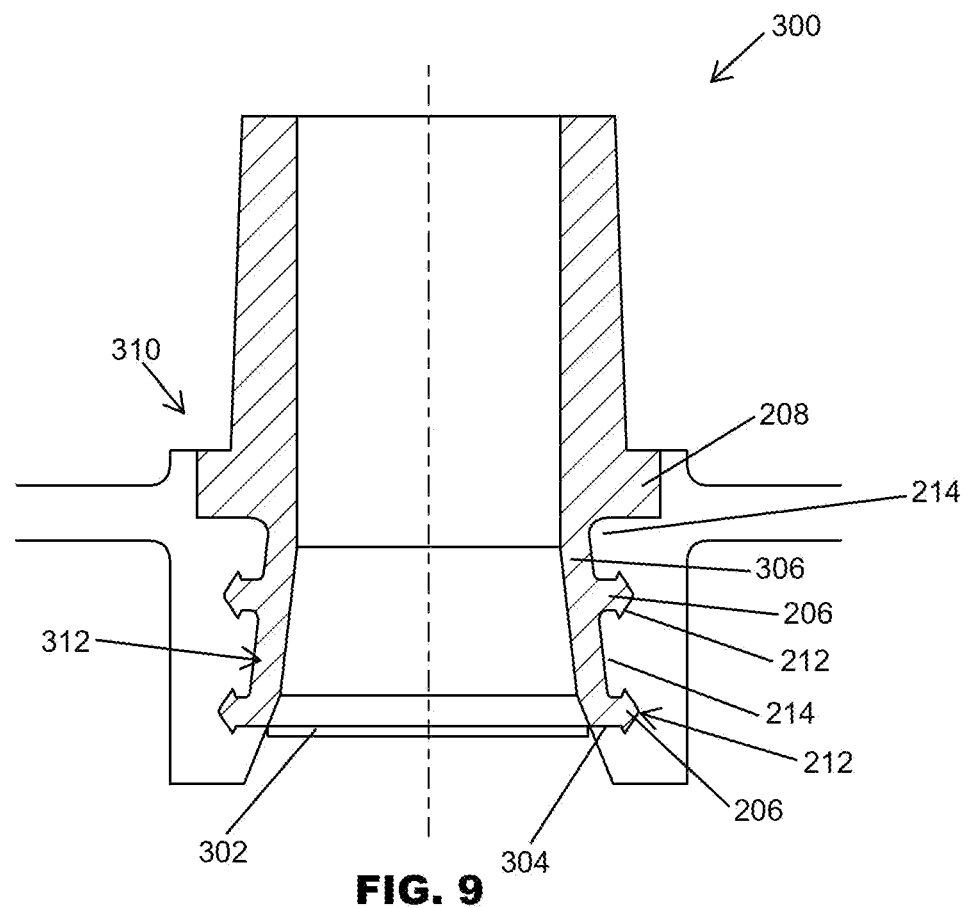
FIG. 9 is a cross section view of a battery terminal bushing for use with the battery terminal shown in FIGS. 1-6.
Figure 10:
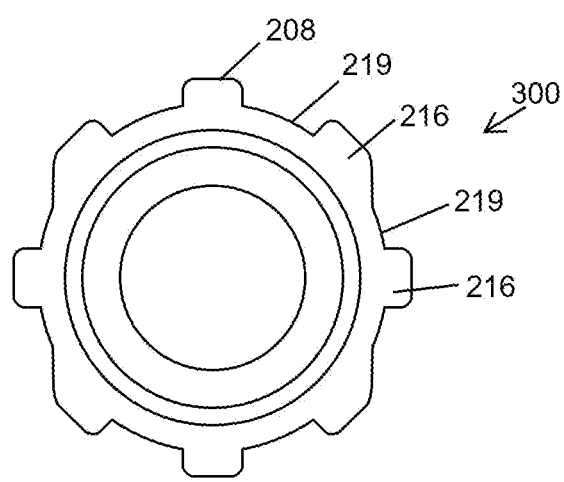
FIG. 10 is a top plan view of a battery terminal bushing for use with the battery terminal shown in FIGS. 1-6, 9, showing an example of an anti-torque ring or feature surrounding the circumference of the battery terminal bushing.

A first example of embodiments of such a bushing is shown in FIGS. 9-10. FIG. 9 illustrates a cross section view of a battery bushing 300 for use with the battery terminal shown in FIGS. 1-6, namely a top mount battery bushing for a terminal 118, 119 which may extend from the cover 116 of the battery 100. A second example of embodiments of such a bushing is shown in FIGS. 11-18. In FIGS. 11-18, a side terminal bushing 400 is illustrated for use with a battery 200 shown in FIGS. 7-8.

In order to solve the technical problem of electrolyte leakage, the bushing 300, 400 includes a plurality of spaced apart circumferential projections or acid rings or sealing rings 206, separated by gaps or cavities 214, which forms a labyrinth. In the illustrated embodiment, one or more circumferential projections or acid rings or sealing rings 206 are shown. In FIGS. 9-12 two circumferential projections or acid rings or sealing rings 206 are shown. In FIG. 13-18 one and one-half (½) circumferential projections or acid rings or sealing rings 206 are shown. The circumferential projections 206 extend from the external surface of the bushing 300, 400 on a lower segment 312, 412 of the bushing which is provided in the polymer housing 114 or cover 116 material. The circumferential projections 206 may include an undercut on an outer portion of the projection. In the illustrated example, this undercut forms an "arrowhead" shape 212 on the outer portion of the projection 206, although variations thereon may be acceptable. Between circumferential projections 206 an annular cavity 214 is therefore formed. The combination of circumferential projections 206 and cavity(s) 214 form a labyrinth through which electrolyte must move in order to leak from or escape from the interior 115 of the battery 100, 200. While arrowhead shaped circumferential projections are described, variations thereon may be acceptable, including, for example asymmetric, rounded, or two different projections, without departing from the intended purposes, namely providing a labyrinth through which acid must traverse in order to escape the battery (i.e. leak).

In order to solve the technical problem of torque placed on the bushing 300, 400 and rotation of the bushing, the bushing 300, 400 also includes one or more anti-torque features 208, 210 which provide resistance to torque and resistance to rotation of the battery terminal and bushing in the battery housing 114 or cover 116. To this end, a battery terminal bushing 300, 400 is provided. The battery terminal bushing 300, 400 comprises a body 306, 406 having an insertion end 304, 404 and an exterior end 310, 410 opposite the insertion end, and one or more sealing rings 206 on the body. A plurality of anti-torque features 208, 210 may be provided on the body. The anti-torque features 208, 210 comprise a surface area that assists in providing a resistance to torque. The anti-torque features 208, 210 may be an anti-torque pattern provided on the body 306, 406 which comprises a resistance to torque.

FIG. 10 is top plan view of a battery bushing 300, showing an example of an anti-torque feature, namely an anti-torque ring 208 surrounding the circumference of the battery bushing 300. FIGS. 11, 13, 15, and 18 present additional views showing one or more examples of an anti-torque ring 208 surrounding the circumference of a battery bushing 400. In both instances, the anti-torque ring 208 is provided circumferentially surrounding the bushing 300, 400 on the segment of the battery bushing which engages the polymer of the housing 114 or cover 116. The anti-torque ring 208 is provided in close proximity to the external surface of the polymer housing 114 or cover 116, with the acid or sealing rings 206 provided below the anti-torque ring 208, or further inward toward the interior of the polymer. In the illustrated embodiments, the anti-torque ring 208 may be a first anti-torque feature and is an area of increased surface area surrounding a portion of the bushing. To this end, the anti-torque ring 208 may include a pattern of alternating peaks 216 or protrusions and valleys 219, (e.g., forming "teeth"), which provide an increased surface area to the anti-torque ring as compared to a more rounded surface. Various patterns and profiles of teeth may be used to accomplish the objective of torque resistance. In particular, patterns which provide more surface area to provide engagement between the bushing and the polymer housing 114 or cover 116 may be preferred. While specific examples are illustrated, any pattern which accomplishes the purposes provided herein may be acceptable.

The bushing 300, 400 may also include a second anti-torque feature 210. The second anti-torque feature 210 is an area of increased surface area on a second surface of the battery bushing which is spaced from the first anti-torque feature 208. In particular, a second anti-torque feature 208 may be provided on or near the internal portion of the battery housing 114 or cover 116, for example, on a bottom 312, 412 or back surface or insertion end 304, 404 of the bushing. The second anti-torque feature 210 may be an area of peaks and valleys, curves, or other undulations or surface roughening. In the illustrated example shown in FIGS. 12, 14, 16, and 18, the second anti-torque feature 210 surrounds the terminal post connection area or segment 402, which peaks 316, valleys 318, curves 320, and/or undulations to form a variation in dimension on the surface, or otherwise a surface configured to increase the surface area. In one or more examples of embodiments, the second anti-torque feature 210 may cooperate with the first anti-torque feature 208 in the resistance to torque placed on the battery terminal and bushing. In this regard, the anti-torque features 208, 210 may comprise, alone or in combination, a surface area of at least approximately 200 to 230 mm2, or more, on one or more surfaces of the battery bushing 300, 400. Use of additional surface area on surfaces which engage the polymer of the housing 114 or cover 116 provide a desired resistance to rotation. The anti-torque features 208, 210 which add surface area to the bushing 300, 400 prevent or resist the rotation of the bushing, such as when a connector or cable 204 is attached to the battery.

As indicated, to achieve a larger surface area various patterns may be employed on a bushing surface or more than one bushing surface. These patterns surround the connector segment 402, which may be used to weld the battery terminal. In one or more examples of embodiments, the connector segment is approximately 0.1 to 1 inch in diameter; and in some examples may be approximately W inch in diameter.

Figure 11:
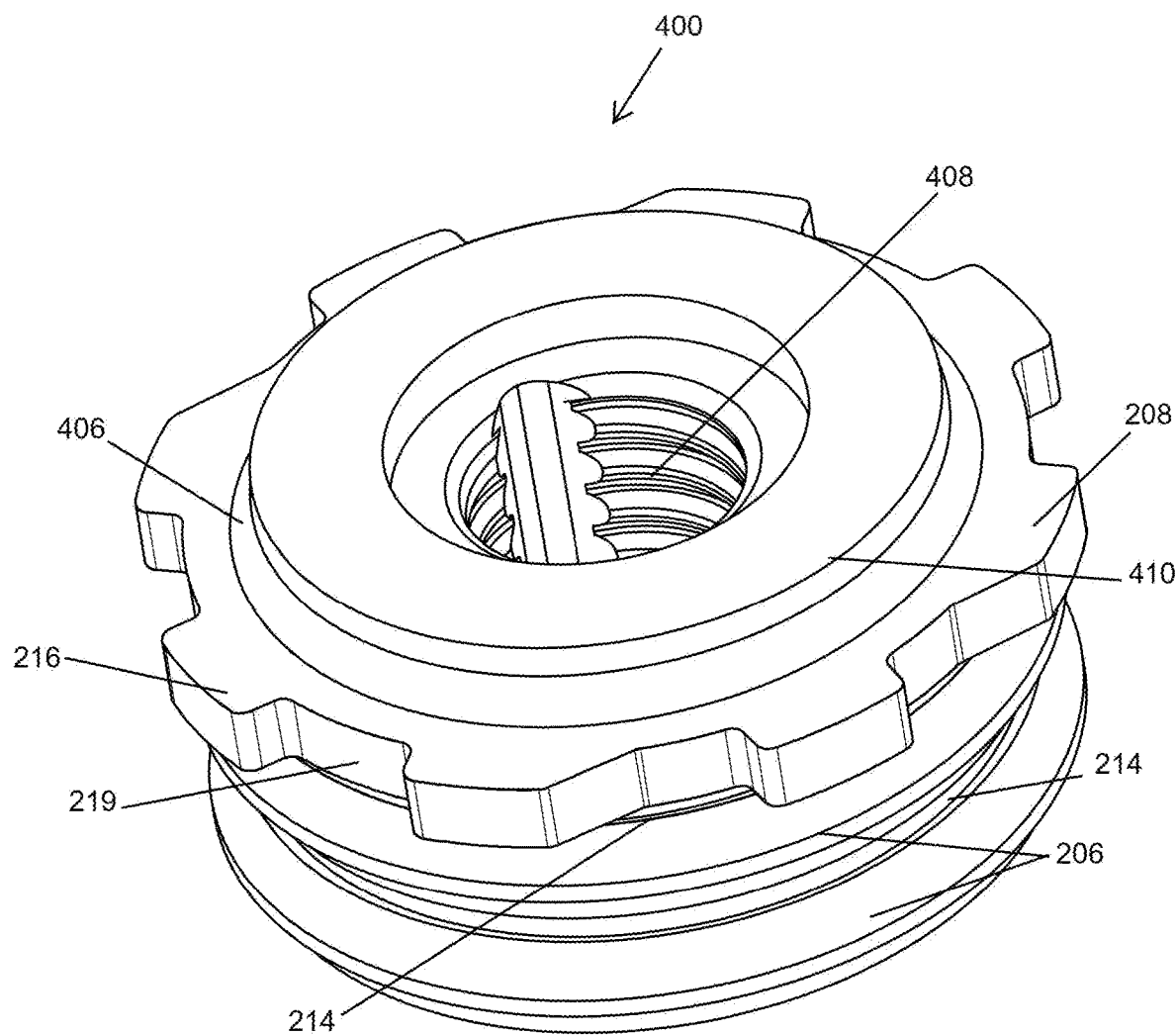
FIG. 11 is a front perspective view of one or more examples of a battery terminal bushing or side terminal bushing for use with the battery shown in FIGS. 7-8.

A first example of a variation in the internal surface, for example, on the insertion end 404 of the battery terminal bushing 400 is shown in FIGS. 11-12, which illustrates an example side terminal bushing. As can be seen in FIG. 12, within the outer boundary of the bushing 400 are a plurality of spaced apart ribs or peaks 316, separated by valleys 318, each extending in opposing directions from a central segment 402 configured to attach to a battery terminal post 121 or 123. Two end segments 322 are also provided which have a generally semi-circular wall. The ribs or peaks 316 form one or more ridges. This pattern is surrounded by an acid ring or sealing ring 206.

Figure 13:
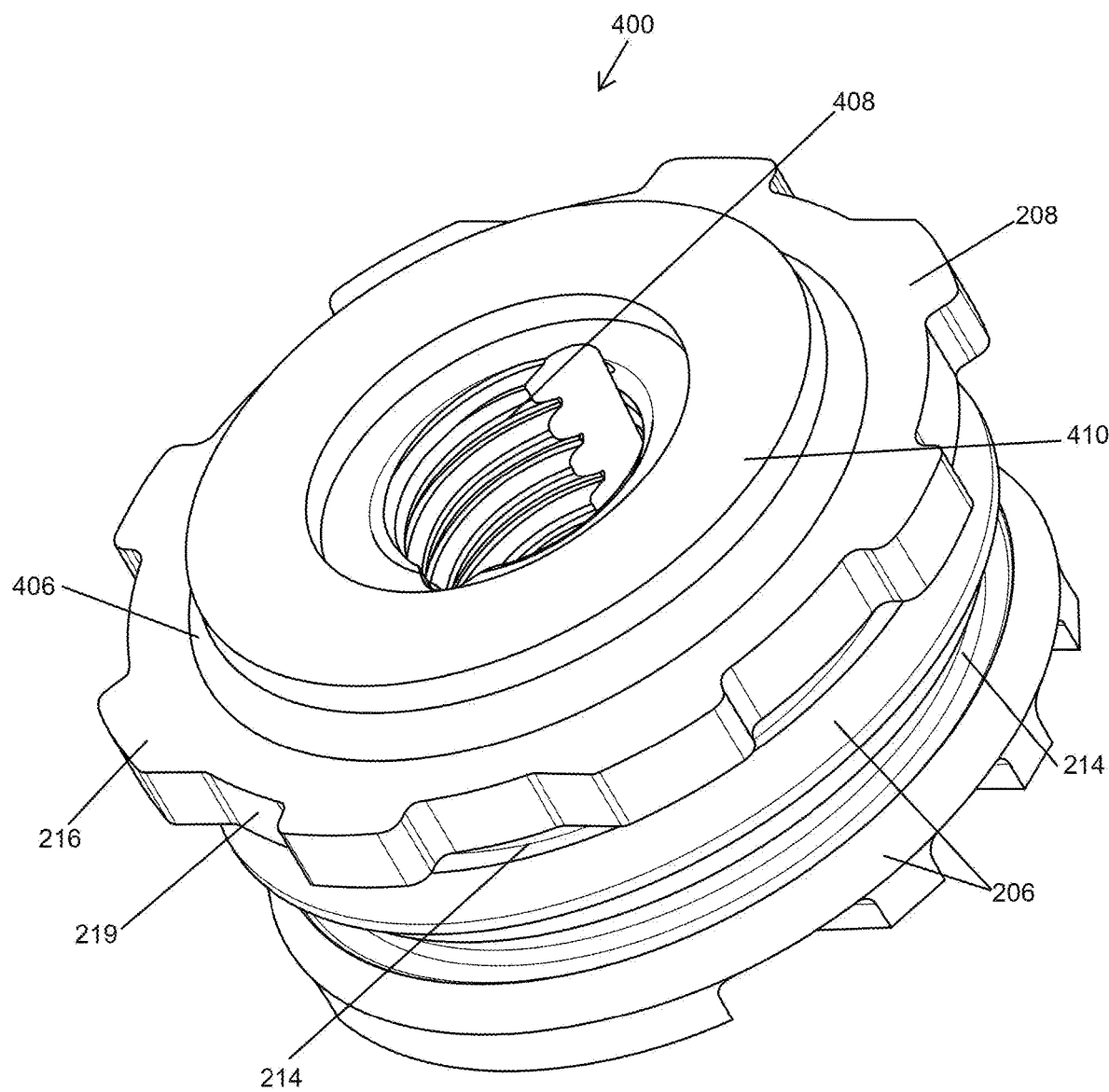
FIG. 13 is a front perspective view of one or more alternative examples of embodiments of a battery terminal bushing or side terminal bushing for use with the battery shown in FIGS. 7-8.
Figure 14:
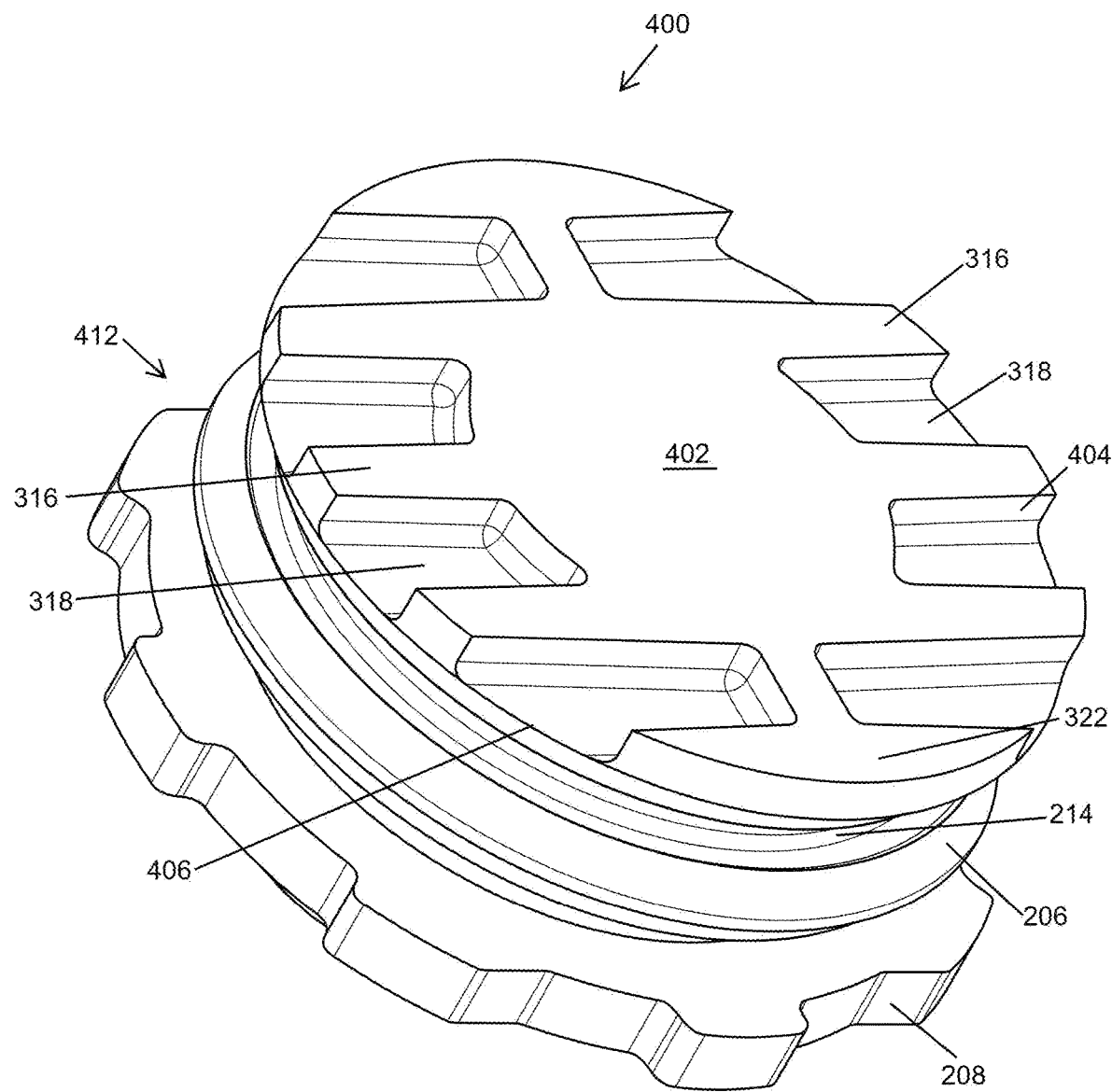
FIG. 14 is a rear perspective view of the battery terminal bushing or side terminal bushing shown in FIG. 13.

A second example of a variation in the internal surface, for example, on the insertion end 404 of the battery terminal bushing 400 is shown in FIGS. 13-14, which illustrates an example side terminal bushing. As can be seen in FIG. 14, within the outer boundary of the bushing 400 are a plurality of spaced apart ribs or peaks 316, separated by valleys 318, each extending in opposing directions from a central segment 402 configured to attach to a battery terminal post 121 or 123. Two end segments 322 are also provided which have a generally semi-circular wall. The ribs or peaks 316 form one or more ridges. Unlike the example shown in FIG. 12, the example shown in FIG. 14 does not include an acid ring or sealing ring surrounding the pattern.

Figure 15:
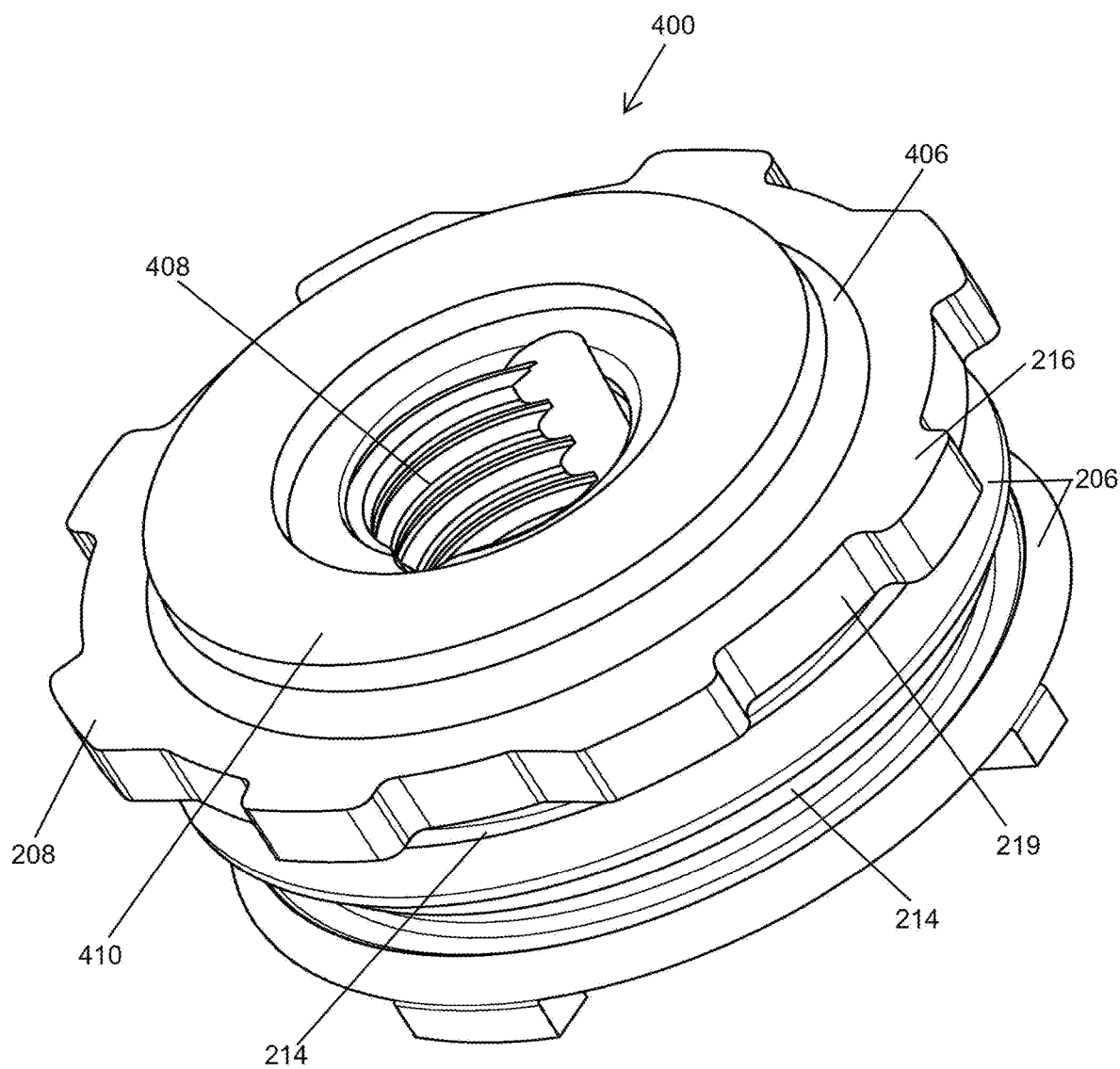
FIG. 15 is a front perspective view of one or more alternative examples of a battery terminal bushing or side terminal bushing for use with the battery shown in FIGS. 7-8.
Figure 16:
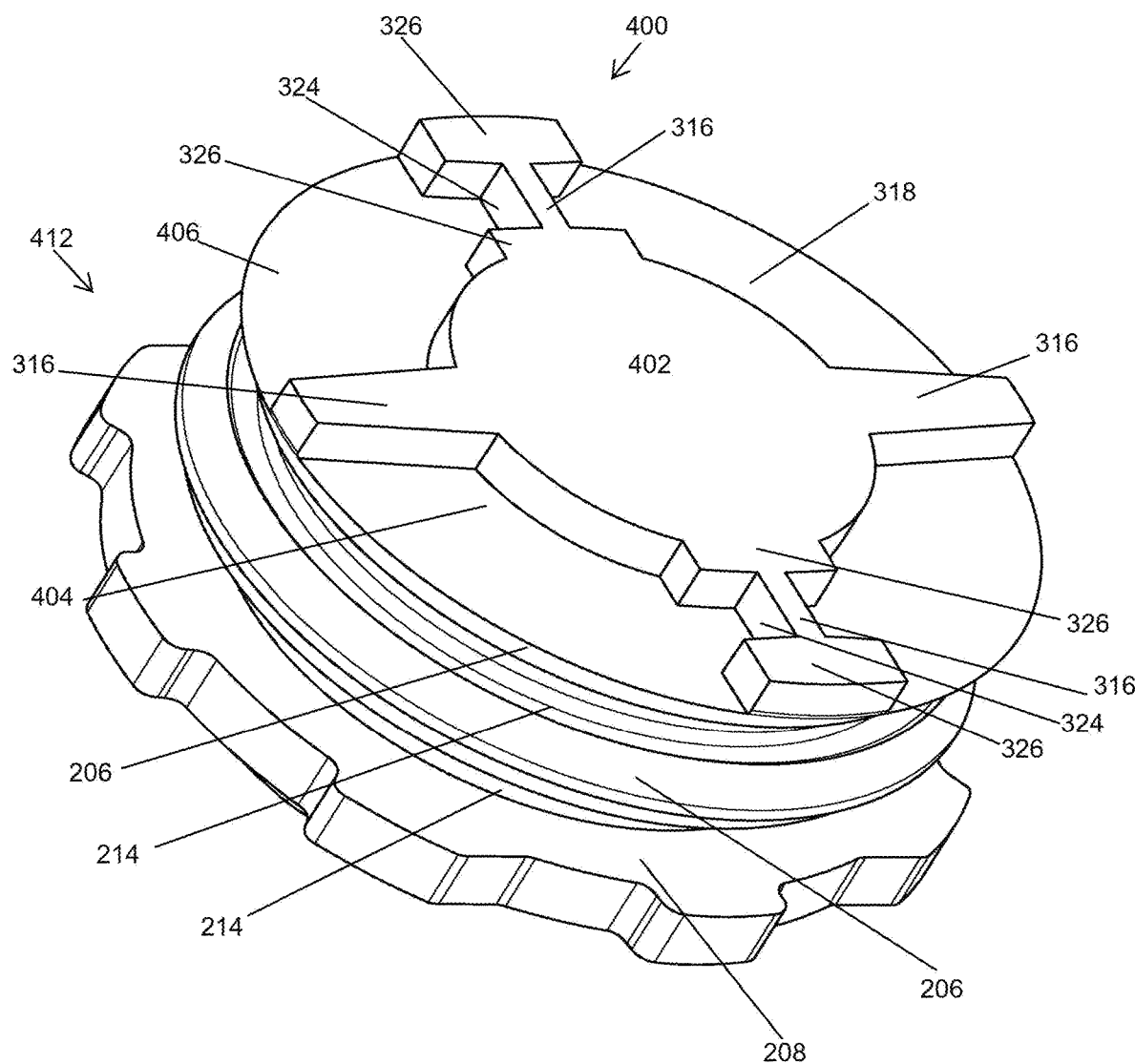
FIG. 16 is a rear perspective view of the battery terminal bushing or side terminal bushing shown in FIG. 15.

A third example of a variation in the internal surface, for example, on the insertion end 404 of the battery terminal bushing 400 is shown in FIGS. 15-16, which illustrates an example side terminal bushing. As can be seen in FIG. 16, within the outer boundary of the bushing 400 are opposing ribs or peaks 316 which extend generally perpendicular to each other from a central segment 402 configured to attach to a battery terminal post 121 or 123. Additional features, such as notches 324 and widened segments 326 are provided on one or more of the ribs 316, providing variations, undulations, ridges, and valleys on the surface.

Figure 17:
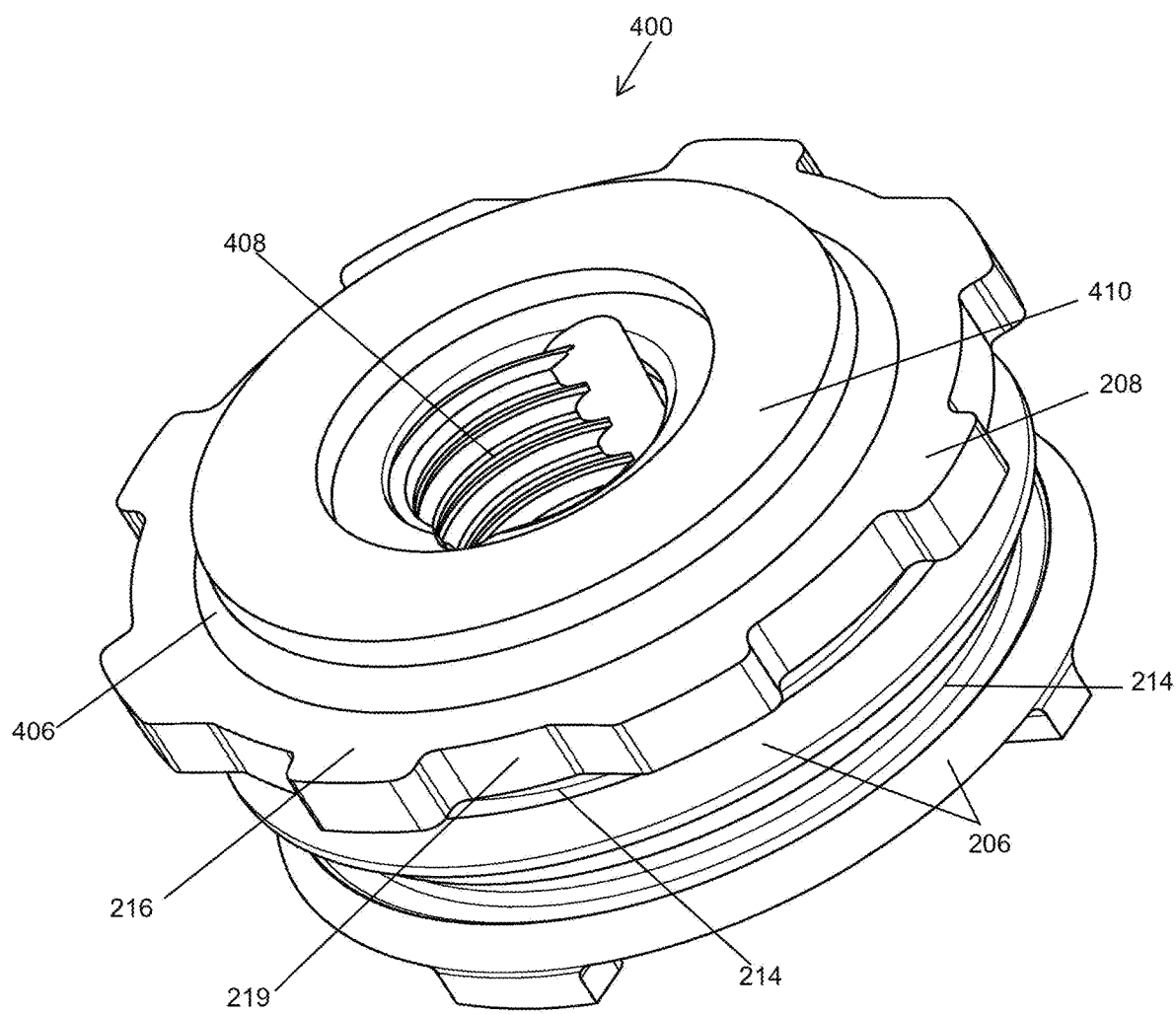
FIG. 17 is a front perspective view of one or more alternative examples of a battery terminal bushing or side terminal bushing for use with the battery shown in FIGS. 7-8.
Figure 18:
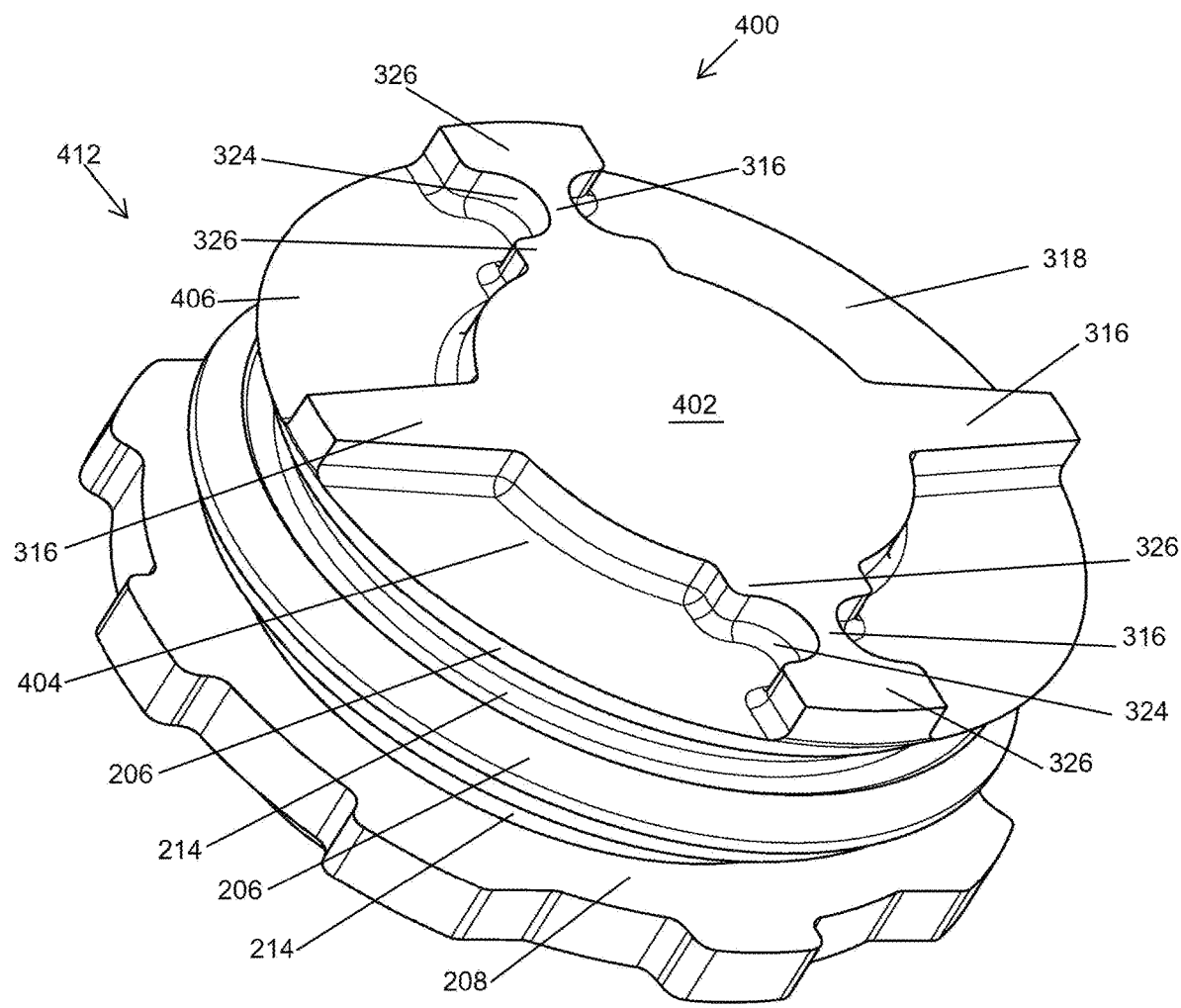
FIG. 18 is a rear perspective view of the battery terminal bushing or side terminal bushing shown in FIG. 17.

A fourth example of a variation in the internal surface, for example, on the insertion end 404 of the battery terminal bushing 400 is shown in FIGS. 17-18, which illustrates an example side terminal bushing. As can be seen in FIG. 18, within the outer boundary of the bushing 400 are opposing ribs or peaks 316 which extend generally perpendicular to each other from a central segment 402 configured to attach to a battery terminal post 121, 123. Additional features, such as notches 324 and widened segments 326 are provided on one or more of the ribs 316, providing variations, undulations, ridges, and valleys on the surface. Unlike the example shown in FIG. 16, the example shown in FIG. 18 includes a rounded edges or ridges on the pattern.

While specific examples are shown, as indicated, variations thereon which accomplish the objectives provided herein are acceptable for both top and side terminals as described herein.

These anti-torque features 208, 210 in one or more examples of embodiments, may be embedded into the plastic of the battery housing 114 or cover 116. In one non-limiting example, the bushing 300 or 400 may be inset molded into the housing 114 or cover 116.

The bushing 300, 400 which includes one or more anti-torque features 208, 210 has resistance to torque and resistance to rotation of the battery terminal and bushing in the battery housing 114 or cover 116. In particular, in one or more preferred examples of embodiments, the battery terminal bushing 300, 400 having one or more anti-torque features 208, 210 has improved performance over existing devices, resisting greater than 150 inch-pounds of torque, and in some examples of embodiments at least 200 inch-pounds of torque, before reaching a failure mode. (The failure value is defined as the maximum torque developed while driving, measured in a rupture gauge.) In other examples of embodiments, the terminal bushing 300, 400 may withstand greater than 750 inch-pounds of torque. Accordingly, the terminal bushing may withstand between 150 and 750 inch pounds of torque or greater.

Accordingly, a battery terminal bushing is disclosed which provides improvements in prevention of electrolyte or acid leakage from the assembled lead acid battery and provides improved resistance to torque or rotation of the bushing when assembled on the battery.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A battery terminal bushing comprising:
a body having an insertion end and an exterior end opposite the insertion end;
one or more sealing rings surrounding the body between the insertion end and the exterior end;
a terminal post connector segment on the insertion end of the body; and
an anti-torque region of increased surface area on one or more surfaces of the body configured to fixedly engage and be contained within a battery housing material, the anti-torque region comprising protrusions and recesses to form a variation in dimension on the one or more surfaces.

2. The battery terminal bushing of claim 1, wherein the anti-torque region comprises a surface area of at least approximately 200 mm2.

3. The battery terminal bushing of claim 1, wherein the bushing has a resistance to torque which is greater than 150 inch-pounds of torque.

4. The battery terminal bushing of claim 1, wherein the bushing has a resistance to torque which is at least 200 inch-pounds of torque, before reaching a failure mode.

5. The battery ter final bushing of claim 1, wherein the battery terminal bushing is a side terminal bushing is configured to mount in a battery housing sidewall.

6. The battery terminal bushing of claim 1, wherein the battery terminal bushing is configured to mount in a battery cover.

7. The battery terminal bushing of claim 1, wherein the anti-torque region comprises a first anti-torque feature comprising an anti-torque ring proximate the exterior end and a second anti-torque feature comprising an anti-torque pattern proximate the insertion end and spaced apart from the first anti-torque feature.

8. A lead acid battery comprising the battery terminal bushing of claim 1.

9. A battery terminal bushing comprising:
a body having an insertion end and an exterior end opposite the insertion end;
one or more sealing rings on the body; and
a plurality of anti-torque features on an outer surface of the body configured to fixedly engage with a battery housing material, wherein the plurality of anti-torque features comprise a surface area of at least approximately 200 mm2 and provide a resistance to torque which is greater than 150 inch-pounds of torque.

10. The battery terminal bushing of claim 9, wherein the bushing has a resistance to torque which is at least 200 inch-pounds of torque, before reaching a failure mode.

11. The battery terminal bushing of claim 9, wherein the battery terminal bushing is a side terminal bushing configured to mount in a battery housing sidewall.

12. The battery terminal bushing of claim 9, wherein the battery terminal bushing is configured to mount in a battery cover.

13. The battery terminal bushing of claim 9, wherein the plurality of anti-torque features comprise a first anti-torque feature including an anti-torque ring proximate the exterior end and a second anti-torque feature comprises an anti-torque pattern proximate the insertion end and spaced apart from the first anti-torque feature.

14. The battery terminal bushing of claim 13, wherein the first anti-torque feature includes a pattern of alternating peaks and valleys in a form of teeth configured to engage and be contained within the battery housing material.

15. The battery terminal bushing of claim 13, wherein the second anti-torque feature comprises a pattern of peaks, valleys, curves, and undulations to form a variation in dimension on a surface.

16. The battery terminal bushing of claim 15, wherein the pattern surrounds a connector segment, the connector segment configured to attach to a battery terminal post.

17. The battery terminal bushing of claim 13, wherein the second anti-torque feature comprises a pattern of ribs separated by valleys extending in opposite directions from a central segment, the pattern of ribs further comprising two end regions having a substantially semi-circular shape.

18. The battery terminal bushing of claim 13, wherein the second anti-torque feature comprises a pattern of ribs extending in perpendicular directions from each other and surrounding a central segment, the pattern of ribs configured to include a notch.

19. A lead acid battery comprising the battery terminal bushing of claim 10.

20. A battery terminal bushing comprising:
a body having an insertion end and an exterior end opposite the insertion end;
one or more sealing rings on the body between the insertion end and the exterior end;
a terminal post connector segment on the insertion end of the body; and
an anti-torque region of increased surface area on one or more surfaces of the body configured to fixedly engage and be contained within the battery housing material, the anti-torque region comprising a first anti-torque feature having an anti-torque ring proximate the exterior end and a second anti-torque feature including an anti-torque pattern proximate the insertion end and spaced apart from the first anti-torque feature, the first anti-torque feature including a pattern of alternating peaks and valleys in a form of teeth and the second anti-torque feature including a pattern of peaks, valleys, curves, and undulations to form a variation in dimension on the one or more surfaces.

* * * * *